United States Patent [19]

Stout

[11] Patent Number: 4,657,234
[45] Date of Patent: Apr. 14, 1987

[54] CHAIN SAW HOLDER

[76] Inventor: James H. Stout, 9423 Emory Rd., Knoxville, Tenn. 37931

[21] Appl. No.: 832,822

[22] Filed: Feb. 24, 1986

[51] Int. Cl.$^4$ ........................ F16M 13/02; B25B 11/00
[52] U.S. Cl. .......................................... 269/97; 269/71; 269/142; 269/249; 269/909; 24/530; 76/78 R; 76/25 A; 83/788; 83/701
[58] Field of Search ...................... 269/909, 97, 98, 45, 269/71, 102, 81, 249, 95, 142; 24/530; 83/788, 701; 76/78 R, 25 A

[56] References Cited

U.S. PATENT DOCUMENTS

| | | | |
|---|---|---|---|
| 1,410,184 | 3/1922 | Hunter | 269/97 |
| 2,282,310 | 5/1942 | Dunn | 269/268 X |
| 3,183,581 | 5/1965 | Lister | 269/45 |
| 4,248,412 | 2/1981 | Der Roy | 269/102 |
| 4,279,396 | 7/1981 | Bendock | 24/530 X |
| 4,351,209 | 9/1982 | Alford | 83/574 X |
| 4,573,385 | 3/1986 | Funkhouser | 83/788 |

Primary Examiner—Donald R. Schran
Attorney, Agent, or Firm—Luedeka & Neely

[57] ABSTRACT

A chain saw holder for holding and supporting a chain saw during refueling, repair and other maintenance operations is disclosed. The chain saw holder includes a clamp for clamping to a fixed support such as a work bench, fence post, or tree branch. An extension member extends away from the clamp to a handle bar attachment means which provides a mouth for receiving a portion of the handle bar and releasably gripping the handle bar therein. The attachment means is adapted to provide for pivotal movement of the mouth about an axis generally perpendicular to the extension member so that the gripped portion of the handle bar is received by the mouth and is gripped in any orientation aligned with, oblique to, or perpendicular to the extension member. The chain saw holder is thereby capable of holding and supporting the saw regardless of the orientation of the fixed support or the extension member.

10 Claims, 9 Drawing Figures

CHAIN SAW HOLDER

The present invention relates to tools for clamping or holding other tools or objects and more particularly relates to a chain saw holder for holding a chain saw during refueling, repair and other maintenance operations.

Unlike other power tools and equipment which are used in factories, garages and home workshops, chain saws are often used in locations which are remote from a work bench or other convenient work surface. Still, it is necessary to refuel the saw and to perform various maintenance operations including adjustment of the chain tension and the engine, chain replacement, and chain sharpening. Most of these operations must be done on site if the user has extensive work to perform at that location. Because chain saws have a shape and balance designed to maximize ease of handling during use, the saws are not easy to work on at a remote location. Even on a solid and relatively level surface such as a tree stump, a chain saw has a tendency to fall over and the user usually needs at least one hand to steady the saw. Consequently, even simple repair operations are difficult. Maintenance is further hampered by exposed portions of the saw which are hot such as the muffler and parts which are both hot and sharp such as the chain and guide bar.

It is therefore an object of the present invention to provide a chain saw holder usable on site for holding a chain saw during refueling, repair and other maintenance operations. It is a further object to provide a chain saw holder of uncomplicated construction which has the capability for attaching to virtually any fixed support including vertical, horizontal and overhead supports.

In accordance with the present invention, there is provided a chain saw holder attachable to a fixed support for holding and supporting a chain saw having a tubular handle bar during refueling and maintenance. The chain saw holder includes a clamp providing a mouth for receiving the fixed support therein and at least one movable jaw which is movable towards and away from an opposing jaw to clamp the fixed support in the mouth between the jaws. An elongted extension member is attached to and extends away from the clamp. Supported on the extension member remote from the clamp is a chain saw attachment means for attaching to the handle bar of the chain saw. The chain saw attachment means includes a mouth for receiving a portion of the handle bar and means for securing it in the mouth. The chain saw attachment means is adapted to provide pivotal movement for the mouth about an axis generally perpendicular to the extension member and enable the mouth to receive the handle bar in orientations aligned with, oblique to, and perpendicular to the extension member.

In accordance with a preferred form of the present invention, the chain saw attachment means includes a C-shaped member pivotally mounted for movement about an axis generally perpendicular to the extension member and dimensioned to provide the mouth for receiving the handle bar. First and second opposing jaws are provided across said mouth which are movable relative to one another to grip the handle bar in the mouth.

In accordance with another preferred form of the invention, the attachment means comprises a spring clip rotatably mounted on said extension member and having a looped-over segment proving the mouth for receiving a portion of the handle bar, the opening to the mouth being smaller than the diameter of the handle bar and the opening is resiliently expandable to receive the handle bar and to secure it in the mouth by the opening partially closing around the handle bar.

The chain saw holder according to the present invention is thus capable of clamping onto any vertical, horizontal, or overhead support within the designed size limits and the mouth of the handle bar attachment means pivots to receive the handle bar regardless of the overall orientation of the tool. The preferred forms of the chain saw holder according to the present invention provide the capability of a tool having swivel or universal joints without mechanical complexity.

The objects and advantages of the present invention may best be understood by the following detailed description of a preferred embodiment and accompanying drawings in which.

Figure 1:
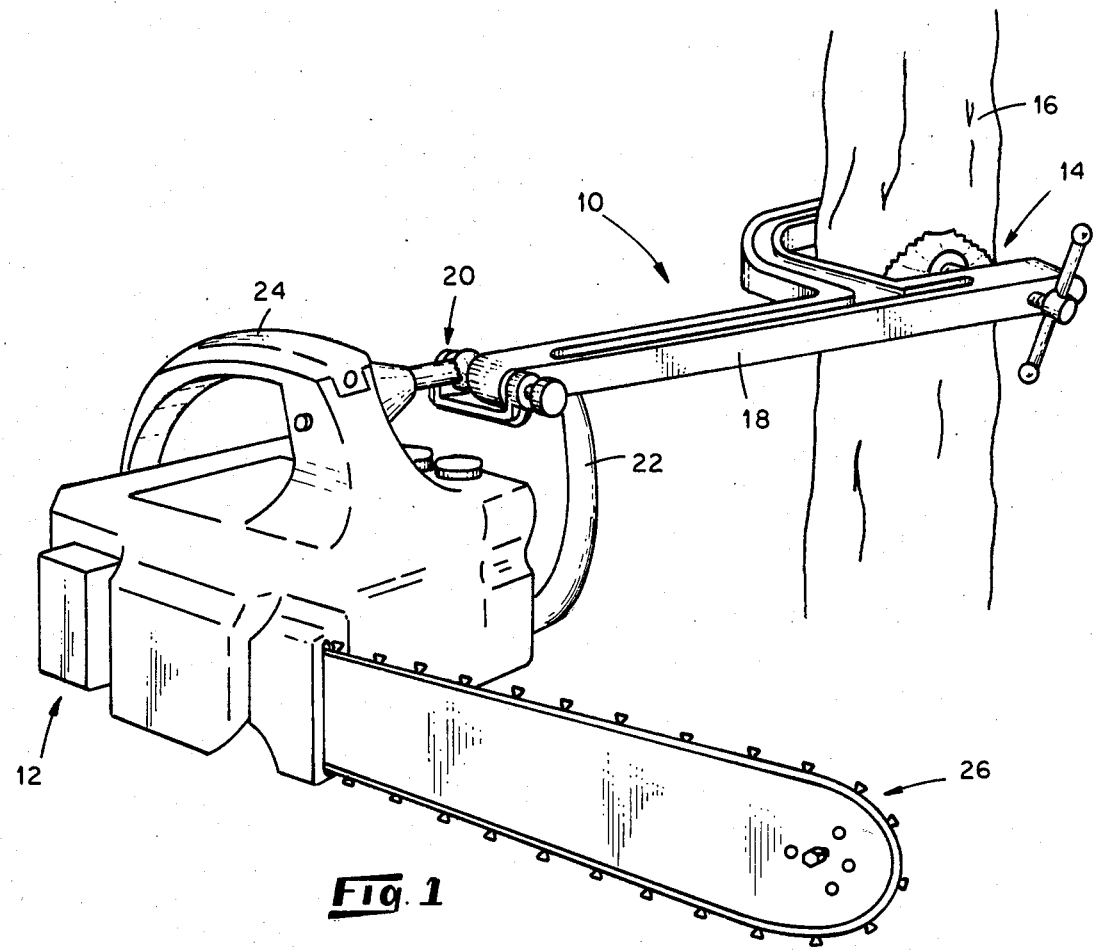
FIG. 1 is a perspective view of an embodiment of the chain saw holder of the present invention shown clamped onto a tree trunk and holding and supporting a chain saw.

Referring now to the drawings in which like reference characters designate like or corresponding parts throughout the several views, there is shown in FIG. 1 an embodiment of the chain saw holder 10 according to the present invention holding a chain saw 12. Generally, the chain saw holder 10 includes a clamp 14 for clamping to a fixed support such as the tree trunk 16 illustrated in FIG. 1. Extending from the clamp is an extension member 18 which extends away from the clamp to support the chain saw 10 at a convenient distance from the fixed support. At the end of the extension member 18 remote from the clamp 14 is chain saw attachment means 20. As will be explained in more detail hereinafter, the chain saw attachment means 20 is operable to receive and grip a portion of the laterally extending handle bar 22 of the chain saw 12 to hold and support the chain saw 12 in a desired position.

Figure 2:
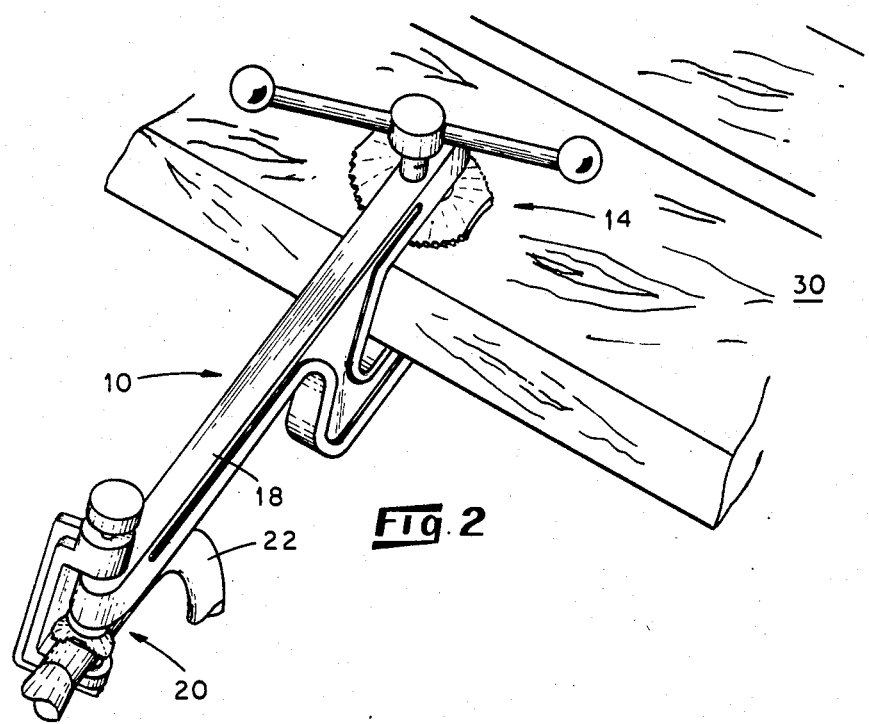
FIG. 2 is a perspective view of the chain saw holder as in FIG. 1 shown clamped to a work bench and holding and supporting a chain saw.
Figure 3:
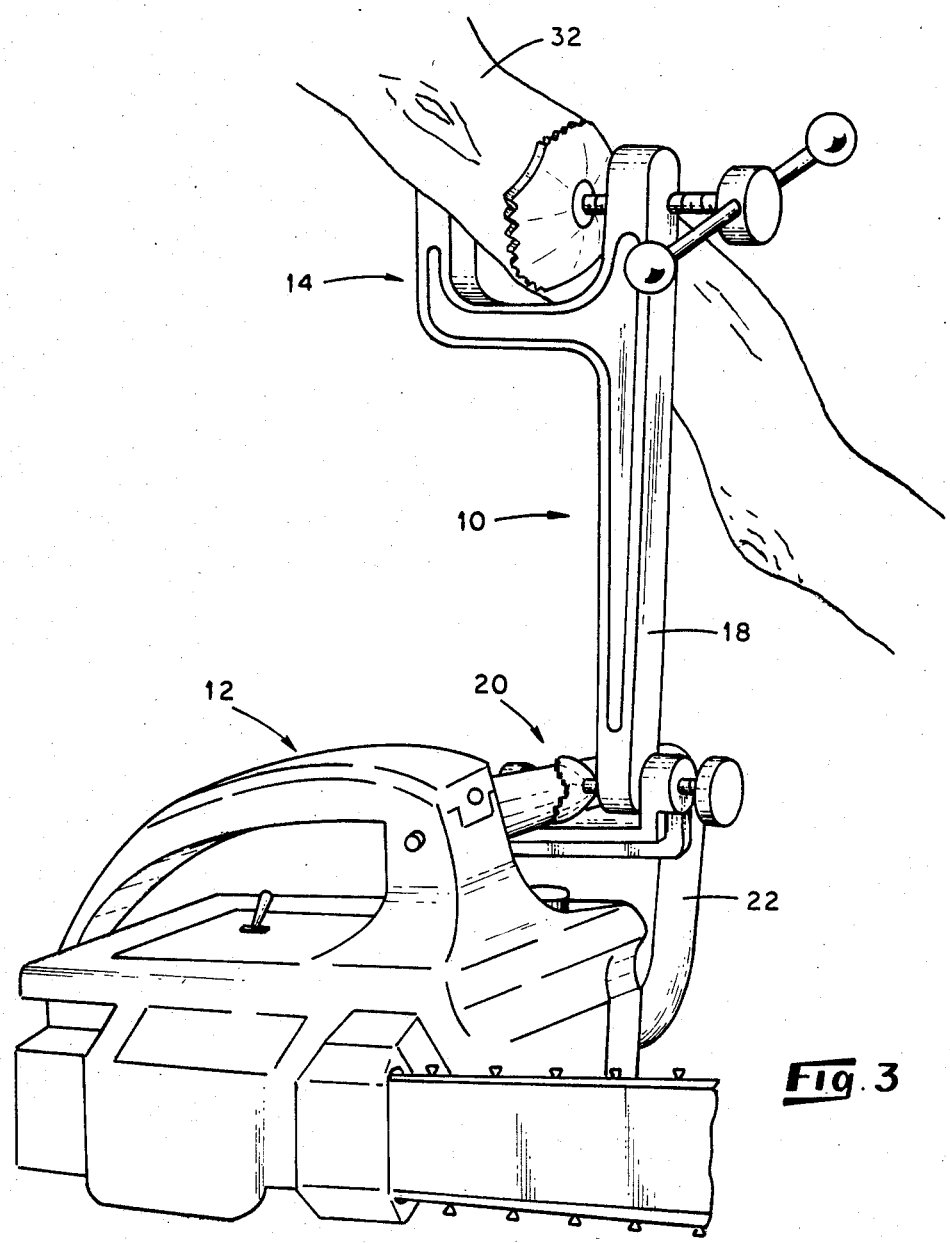
FIG. 3 is a perspective view of the chain saw holder as in FIG. 1 shown clamped to an overhead tree branch and holding and supporting a chain saw.
Figure 4:
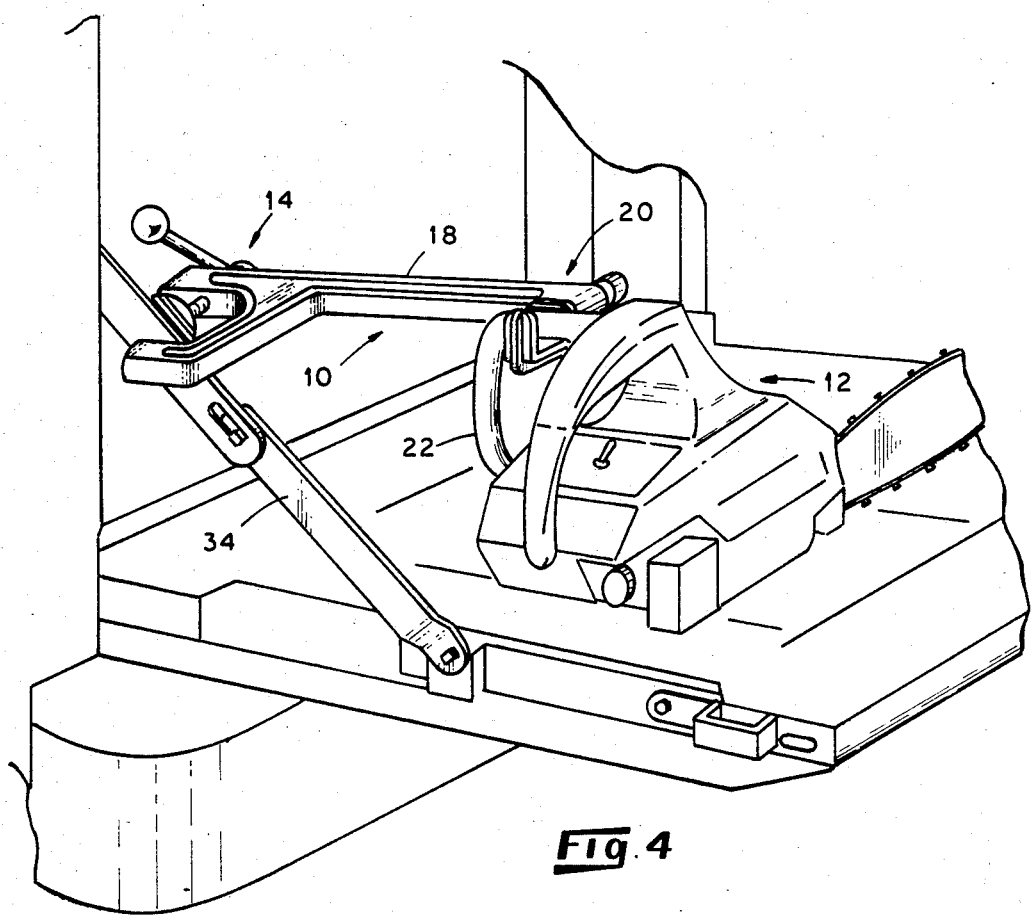
FIG. 4 is a perspective view of a chain saw holder as in FIG. 1 shown clamped on a tail gate brace of a pick-up truck and holding a chain saw.

In FIG. 1, chain saw 12 is supported in an upright position with the pistol grip 24 extending upwardly and the chain and guide bar 26 extending outwardly generally horizontally with the planar surfaces of the guide bar being generally vertical. It is believed this is orientation is preferable for most maintenance opeations but it is to be understood that the chain saw holder 10 is capable of supporting the saw in other orientations if desired. As will become apparent from the following description and drawings, the chain saw holder 10 according to the present invention is capable of supporting the saw in the same orientation as in FIG. 1 while clamped to a horizontal fixed support such as a work bench 30 as shown in FIG. 2, an overhead tree branch 32 as shown in FIG. 3 and as inclined tailgate brace 34 for a pick-up truck as is illustrated in FIG. 4.

Figure 5:
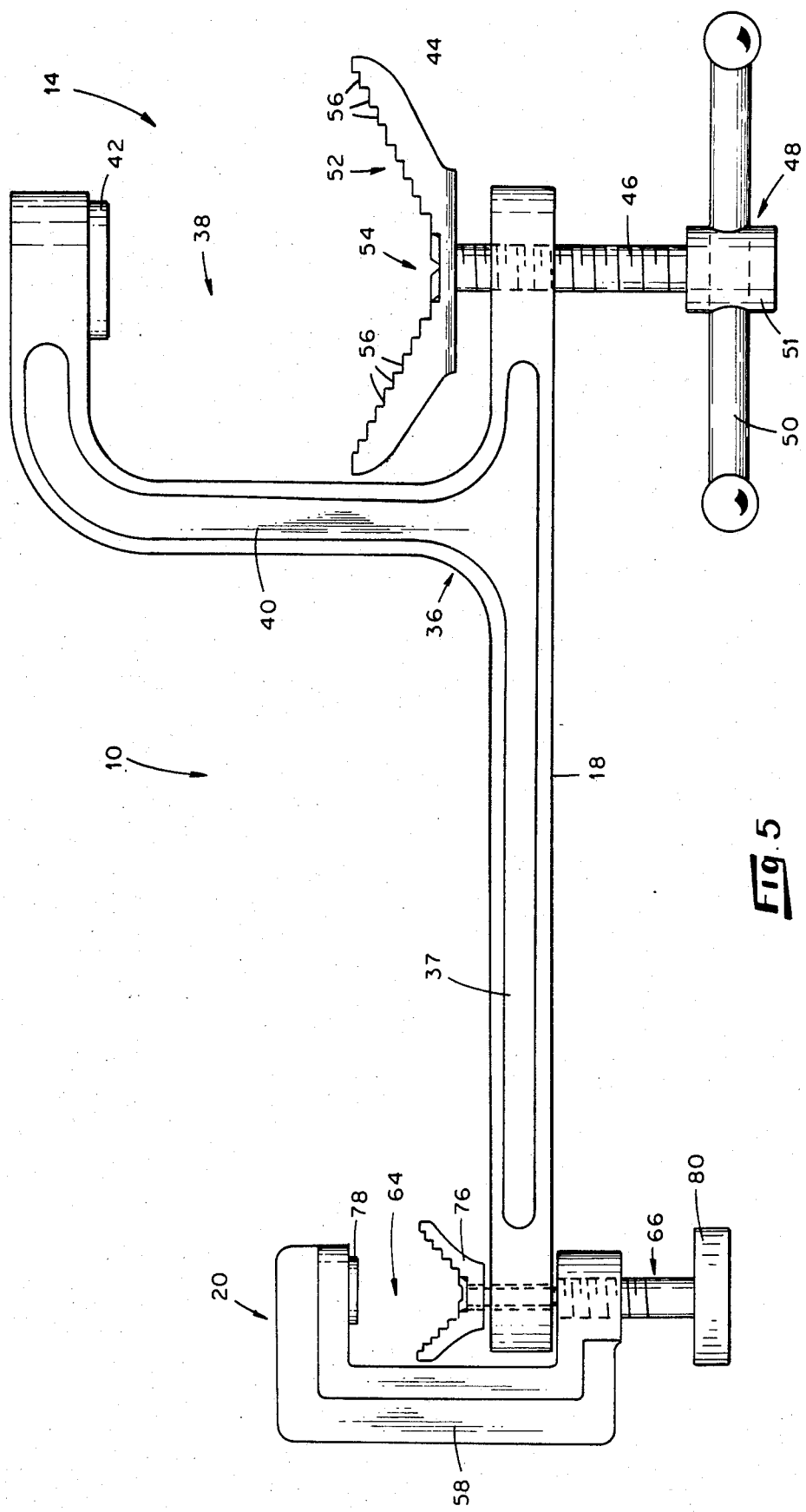
FIG. 5 is an elevational view of the chain saw holder shown in FIGS. 1-4.

Referring now to FIG. 5 which illustrates the embodiment of the chain saw holder 10 of FIGS. 1-5 in more detail, the chain saw holder 10 includes a chain saw holder body 36. The body 36 has an elongated portion 37 which provides the extension member 18 and a C-shaped end 40 extending away from the elongated portion 37. The C-shaped end 40 is suitably dimensioned so that the clamp mouth 38 is capable of receiving small trees, fence posts and tree branches or other anticipated supports. A suitably sized mouth 38 has an opening of about 4-6 inches. Preferably, the elongated portion 37 joins the C-shaped end 40 in alignment with one of the outwardly extending portions of the "C".

The body 36 is constructed from a material sufficiently rigid to support a chain saw 12 as illustrated in FIGS. 1-4. Fabrication from machined steel, forgings or castings is suitable to provide the body 36.

As depicted in FIG. 5, the chain saw holder 10 is provided with jaws for securing the fixed support in said mouth 38. Preferably, the outwardly extending portion of the C-shaped end 40 remote from the elongated portion 37 is provided with a fixed jaw 42. The fixed jaw 42 preferably is a pad of generally cylindrical shape and can be machined or cast as part of the C-shaped end 40 of the body 36. In the embodiment of FIG. 5, the clamp 14 further includes a movable jaw 44 for movement towards and away from the fixed jaw 42 to clamp the fixed support therebetween. Preferably, movement towards and away from the fixed jaw 42 is provided by threaded shaft 46 which is threadably fitted into a bore in the portion of of the C-shaped end 40 aligned with the elongated portion 37. The threaded shaft 46 has a suitable length so that the movable jaw 44 is movable to contact or to approach contact with the fixed jaw 42 so that fixed supports ranging in size from the maximum size receivable in said mouth 38 to very thin supports may be secured in the clamp 14. The threaded shaft 46 is provided with a rotatable connection to the fixed jaw so that the threaded shaft can be rotated to move the movable jaw 44 towards the fixed jaw 42 without rotating the movable jaw 44. To facilitate the application of a large force of rotation to the threaded shaft 46, a T-handle 48 such as the vice-type T-handle with a sliding bar 50 through a shaft head 51 is preferably provided as depicted in FIG. 5.

Figure 7:
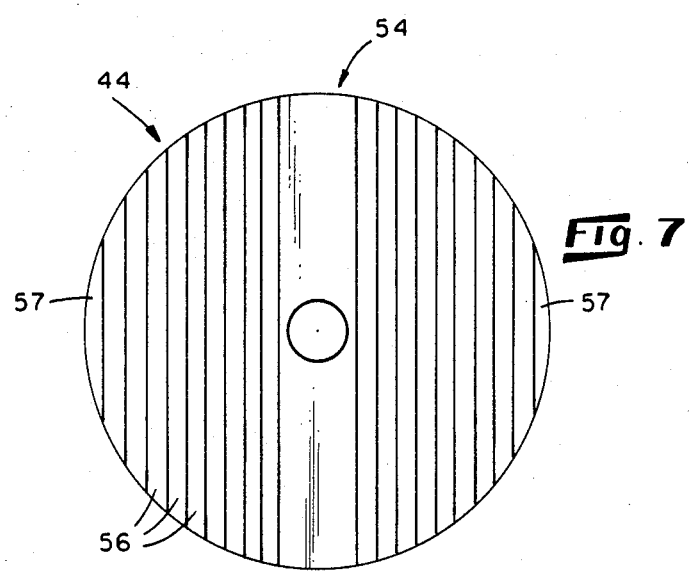
FIG. 7 is a plan view of the inside surface of a clamping jaw forming a part of the chain saw holder shown in FIGS. 1-5.

Referring now to both FIGS. 5 and 7, movable jaw 44 is provided with an clamping surface 52 which is adapted to clamp to planar, cylindrical, and generally cylindrical yet somewhat uneven surfaces. The preferred configuration for the clamping surface 52 is most easily understood by reference to both FIGS. 5 and 7. In FIG. 5 it is illustrated that the movable jaw is provided with a wide, generally V-shaped groove 54 with its center line generally intersecting the axis of the threaded shaft 46 at a right angle. The V-shaped groove 54 is operable to at least partially receive cylindrical objects which have been inserted into the mouth 38 of the clamp 14 and at least partially into the groove. The V-shaped groove 54 centers the objects with respect to the movable jaw as the object is clamped between the movable jaw 44 and the fixed jaw 42. To securely clamp to cylindrical objects, particularly those with uneven surfaces such as tree trunks or fence posts, the inner gripping surface in the groove 54 is provided with teeth 56 which can "bite" into the surface of the fixed support if sufficient pressure is applied.

In FIG. 7, it is illustrated that the movable jaw is preferably round in shape and has a diameter sufficient to span the distance between the shaft 46 and back portion of the C-shaped end 40 of the body 36. Since the shaft 46 is freely rotatable with respect to the voable jaw 44, the movable jaw is freely rotatable with respect to the body 36, and no specific orientation of, for example, a cylindrical fixed support is necessary for the clamp 14 to clamp to it. The body 36 can thus be supported with the extension member 18 extending away from the support in a range of directions. The clamping surface of the movable jaw also enable the clamp 14 to grip a work bench 30 as is shown in FIG. 2. For such use, the the inner gripping surface 52 has generally planar contact areas 57 preferably perpendicular to the axis of the shaft 46 at the periphery of the movable jaw 44 remote from the center of the V-shaped groove 54 for contacting planar surfaces.

Referring still to FIG. 5, the embodiment for of the chain saw attachment means 20 as in FIGS. 1-5 is illustrated in detail. As shown in FIG. 5 this preferred attachment means 20 includes a C-shaped member 58 which is pivotally connected to the chain saw holder body 36 at the end of the elongated portion 37 remote from the C-shaped end 40. The C-shaped member 58 provides an attachment means mouth 64 for receiving the chain saw handle bar 22.

As illustrated, the C-shaped member 58 is preferably connected to the chain saw holder body 36 with the elongated portion 37 of the body 36 within the opening provided by the C-shaped member 58. The C-shaped member is dimensioned to provide the attachment means mouth 64 between the elongated portion 37 and the remote opposing portion of the C-shaped member. The C-shaped member 58 is connected at the end of the elongated portion 37 with a pivotal connection to pivot about an axis generally perpendicular to the length of the extension member 18 through an angle of 90° and most preferably about 180°. In the embodiment depicted the forward opening into the mouth 64 is thus movable for access of the handle bar 22 into the mouth from about a 180° range of directions.

Figure 6:
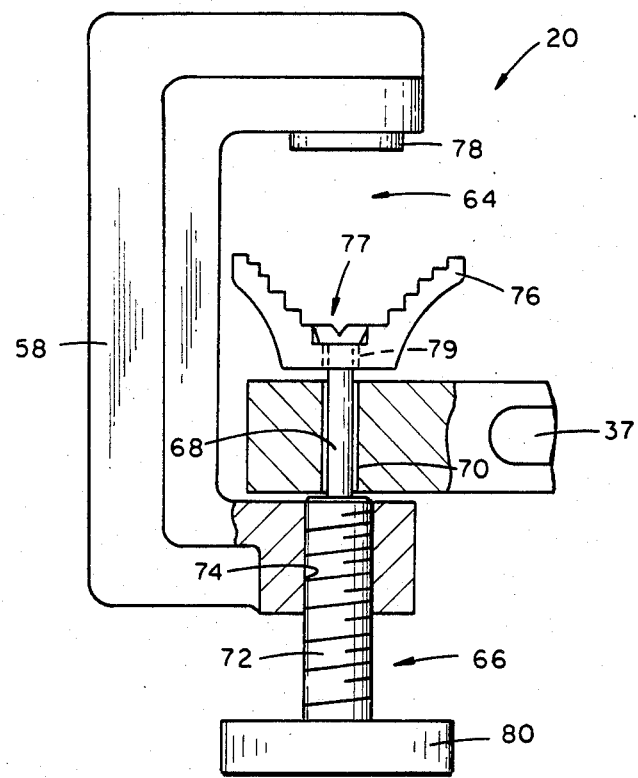
FIG. 6 is a partial elevational view shown partially in cross section of one form of a chain saw attachment means forming one part of a chain saw holder shown in FIGS. 1-5.

As illustrated in FIG. 5 and FIG. 6, pivotal movement of the C-shaped member 58 and securing action of the attachment means is preferably provided an attachment means shaft 66 and opposing first and second jaws 76 and 78, respectfully. The shaft 66 is provided with the first jaw 76 adjacent to the elongated portion 37 of the body 36 which opposed the second jaw 78 across the mouth 64 which is mounted on the portion of the C-shaped member 58 remote and opposing the elongated portion 37. The shaft 66 is operable to cause the jaws to move together to cause the handle bar 22 to be gripped in the attachment means 20. Preferably, the shaft 66, and thus the axis of pivotal movement of said C-shaped member 50, are generally parallel to the orientation of the clamp 14 and the shaft 46.

In the preferred embodiment depicted, the first jaw 76 is maintained generally stationary with respect to the body 36 and the shaft 66 causes the C-shaped member 58 to be urged towards the body 36 to move the second jaw 78 towards the first jaw 76. Preferably, as shown in FIG. 6 this is accomplished by employing an attachment means shaft 66 which has a first section 68 which is journalled in a bore 70 through the elongated portion 37 of the chain saw holder body 36. The attachment means shaft 66 has a second section 72 which is threaded and which fits into a threaded bore 74 in the portion of of the C-shaped member 58 below the elongated member as in FIG. 6. Rotation of the attachment means shaft 66 causes the C-shaped member 58 to move downwardly with respect to the chain saw holder body 36 and causes the second jaw 78 to be moved towards the opposing first jaw 76.

As is also illustrated in FIGS. 5 and 6, the first jaw 76 is smaller yet similar in shape to the movable jaw 44 of the clamp 14. The jaw is preferably round in shape and has a V-shaped groove 77 on its inside surface for gripping the cylindrical chain saw handle bar 22 as has been described for the movable jaw 44 for cylindrical fixed supports. The first jaw is rotatably fitted on the attachment means shaft 66 preferably by forming a bore 79 in the jaw 76 at the center of the V-shaped groove 77 for admitting the end of first section 68 of the shaft 66 through the jaw 76. The jaw 76 is suitably rotatably secured to the first section by, for example, enlarging the end of the shaft 66 after placement of the jaw 76 thereon.

As illustrated most clearly in FIG. 6 for the embodiment depicted, the first section 68 of the shaft 66 is smaller in diameter than the threaded second section 72. The first section is thus maintained in and is free to rotate in the bore 70 and is held in the bore 70. The second section 72 which has a diameter too large to pass through the bore 70 and thereby urges the second jaw 78 of the C-shaped member 58 when the shaft 66 is rotated and thus is operable to engage the handle bar 22 when placed in the mouth 64 and the chain saw handle bar 22 is gripped between the first and second jaws.

The second jaw 78 is suitably provided by a pad of generally cylindrical shape and can be machined or cast as part of the C-shaped member 58. The preferred attachment means 20 further includes a knob 80 at the end of the attachment means shaft 66 for facilitating rotation of the shaft 66 to cause the attachment means 20 to engage and grip the handle bar 22. The knob 80 as illustrated is preferred due to the lesser force required to grip the chain saw handle bar 22 but it will be understood that a properly proportioned T-handle can also be employed. Rotation of the shaft 66 causes the C-shaped member 58 and the second jaw 78 to move towards the first jaw 76 and thus grip the handle bar 22 between the first and second jaws. The first jaw 76, being rotatably mounted on the shaft 66, freely rotates to receive the handle bar 22 in the V-shaped groove 77.

Figure 8:
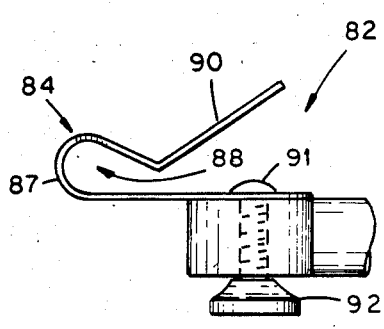
FIG. 8 is an elevational view of an alternate chain saw attachment means.
Figure 9:
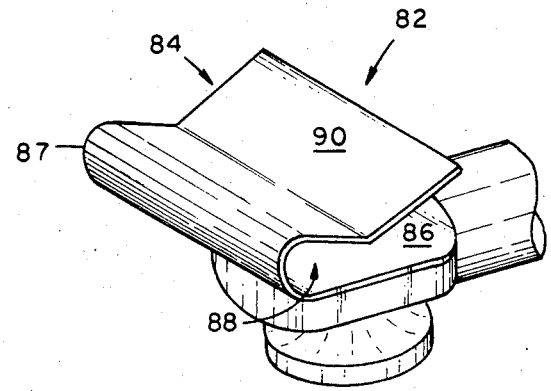
FIG. 9 is a perspective view of the alternate attachment means of FIG. 8.

FIGS. 8 and 9 illustrate an alternate attachment means 82 for attaching to the handle bar 22. Alternate attachment means 82 is intended for use during refueling or in such operations where it is not necessary to have an extremely secure hold of the chain saw but where speed and ease of insertion and removal are important. Alternate attachment means preferably includes a spring steel clip 84 for receiving and securing the handle bar 22 on the chain saw. The spring steel clip 84 includes a base plate 86 pivotally attached to the elongated member 37 chain saw holder body 36. As it extends away from the elongated member 37, the base plate 86 merges into a looped-over area 87 form a receptacle mouth 88 which is adapted to receive and hold the handle bar 22 in the mouth 88. A guide plate 90 extends from the looped-over area 87 at an angle extending away from the base plate 86 and thus aids in guiding the handle bar 22 into the receptacle mouth 88. The opening into the receptacle mouth 88 is smaller then the diameter of the handle bar 22 and resiliently widens upon insertion of the handle bar. The spring steel clip 84 returns at least partially to its original configuration to secure the handle bar in the receptacle mouth 88.

The spring steel clip 84 is pivotally mounted on the end of the elongated portion 37 of the chain saw holder body 36 so that it is operable to receive the handle bar 22 from a variety of directions. Preferably, the axis of the pivotal movement is generally parallel to the orientation of the clamp 14 and the shaft 46 as for the embodiment depicted in FIGS. 5 and 6. This is preferably accomplished by employing a bolt 91 as illustrated in FIG. 8 which extends through the base plate 86 of the clip 84 and into a bore in the elongated portion 37 chain saw holder body 36. A knob 92 with a threaded bore matched to the bolt 91 is suitably employed to tighten the screw to secure the spring steel clip 84 in the desired position. The alternate attachment means 82 is usable on the same chain saw holder body 36 and clamp 14 as has been described for the embodiment of FIGS. 5 and 6 with the screw being dimensioned for free rotation in the bore 70 in the elongated member.

For use at the work location, the chain saw holder 10 according to the present invention is taken by the user of the chain saw to the work site. The user finds a suitable support such as a sapling, fence post, or tree branch to "set up shop" and uses the clamp 14 to attach the chain saw holder to a fixed support by turning the T-handle 48 with the support in the mouth 38. The movable jaw engages the support and the support is clamped between movable jaw 44 and the fixed jaw 42. Once the chain saw holder 10 is in position, the user of the chain saw can begin working on the task at hand and the chain saw holder 10 will be ready for use as needed.

Referring to FIG. 1 showing use with a vertical fixed support such as the tree trunk 16, the T-handle 48 is used to tighten the clamp to the tree as illustrated. With the chain saw holder attached as shown, the C-shaped member 58 of the chain saw attachment means 20 falls by its own weight into an orientation where the mouth of the chain saw attachment means 20 extends upwardly. The handle bar 22 of the chain saw is then placed into the mouth of the attachment means from above and the knob 80 is rotated to cause the handle bar 22 to be engaged between the first jaw 76 and the second jaw 78. For use with the alternate attachment means 82 the bolt 91 and knob 92 are left loose and the spring steel clip 84 will fall under its own weight into position where the handle bar 22 could be inserted from above by simply dropping the chain saw handle bar 22 into the clip and snapping it firmly into the mouth receptacle 88.

Use with an overhead tree branch as illustrated in FIG. 3 is similar. The clamp 14 is used to clamp onto the overhead tree branch and again the C-shaped member 58 pivots by its own weight so that the mouth of the attachment means 20 is oriented upwardly to receive the chain saw. Knob 80 is rotated to cause the first and second jaws 76 and 78 to engage the handle bar 22.

FIG. 4 illustrates how the clamp 14 can clamp onto a planer member of narrow width even at an angle such as the inclined tailgate brace 34 illustrated. The tailgate brace fits into the V-groove 54. Since the brace runs at a generally 45° angle, the orientation of the V-shaped groove 54 is similarly oriented on the approximately 45° angle. The teeth 56 in the V-shaped groove prevent the jaw 44 from sliding on the brace 34 and secure attachment of the chain saw holder 10 is provided. In all other respects, use of the chain saw holder 10 is illustrated in FIG. 4 is similar to use as described previously.

The chain saw holder 10 can be used in a workshop attached to a work bench 30 as illustrated in FIG. 2. In this instance, the C-shaped end 40 of the chain saw body is oriented generally vertically and the T-handle 48 is used to urge the movable jaw 44 towards the fixed jaw 42 to clamp the work bench 30 between the jaws. As shown in FIG. 2, the handle bar 22 inserted laterally into the mouth of the chain saw attachment means 20 and can be inserted from either side as shown. The portion of the handle bar 22 gripped can be aligned with the extension member 18 of the chain saw holder body 20 36 if desired so that the chain saw will be in a similar orientation to that shown in FIG. 1.

The chain saw holder 10 according to the present invention is thus capable of clamping to fixed supports up to the designed maximum dimensions of the clamp 14. The support can be cylindrical, generally cylindrical, irregular or have flat surfaces and secure attachment is accomplished. Virtually any fixed support can be clamped up to the designed maximum including vertical, horizontal, and overhead supports with any of these supports the chain saw attachment means 20 is capable of receiving and securely attaching the handle bar 22 of the chain saw 12. The chain saw holder according to the present invention thus provides the function of a tool including more complicated mechanisms such as universal joints or swivel mechanisms with a simple design as shown. The chain saw holder 10 enables secure clamping and releasing in seconds and allows for both hands of the user to be free to perform the frequent and varied forms of maintenance required in the operating of a power chain saw. The present invention is uniquely designed to provide holding and safety accommodations to a degree never before available for the chain saw user. The embodiment as illustrated in FIGS. 8 and 9 further provides the advantage that the saw can be secured in the attachment means 20 by simply inserting it once the chain saw holder 10 is in place at the job site without any subsequent manipulation of the tool.

While preferred embodiments have been shown and described, it will be understood that there is no intent to limit the invention by such disclosure, but that it is intended to cover all modifications and alternate constructions falling within the spirit and scope of the invention as defined in the appended claims.

What is claimed:

1. A chain saw holder attachable to a fixed support for holding and supporting a chain saw during refueling and maintenance, the chain saw having a laterally extending tubular handle bar, said chain saw holder comprising:

clamp means for clamping to the fixed support, said clamp means having means defining a clamp mouth for receiving the fixed support therein and for supporting at least one movable jaw which is movable toward and away from an opposing jaw to clamp the fixed support in said clamp mouth between said jaws;

an elongated extension member attached to and extending away from said clamping means;

chain saw attachment means supported by said extension member remote from said clamp means for attaching to said chain saw, said chain saw attachment means comprising a C-shaped member pivotally attached to said extension member and having an opening defining a handle bar mouth for receiving a portion of the handle bar of the chain saw, and said attachment means further having securing means for securing said handle bar in said mouth, said C-shaped member pivoting about an axis generally perpendicular to said extension member with said axis extending generally across said handle bar mouth to enable said mouth to receive said portion of said tubular handle bar with said portion in orientations aligned with, oblique to and perpendicular to said extension member said securing means comprising first and second jaws opposing each other across said mouth, at least one of said jaws being movable towards the other to secure said handle bar of the chain saw in said mouth;

whereby, said chain saw holder is operable when clamped onto a fixed support to receive and secure a portion of the tubular handle bar and hold and support the chain saw.

2. The chain saw holder of claim 1, wherein said C-shaped member is pivotally attached to said extension member with said extension member bing within the opening of said C-shaped member, said first jaw being supported on said extension member and said second jaw being supported on said C-shape member opposing said first jaw across said mouth, said securing means further comprising means for moving said C-shaped member relative said elongated member to cause said second jaw to move towards said first jaw to engage and secure the chain saw handle bar in said mouth.

3. The chain saw holder of claim 2 wherein said means for urging said C-shaped member comprises a rotatable shaft extending through and being threadably fitted within a bore in the portion of the C-shaped member adjacent said extension member, said shaft being journalled in a bore in said extension member so that rotation of said shaft causes said C-shaped member to move relative to said extension member to cause second jaw to move towards said first jaw.

4. The chain saw holder of claim 3 wherein said first jaw comprises a rotatably mounted jaw having a handle bar contact surface with a V-shaped groove generally centered about the axis of said rotatable shaft for engaging and receiving the tubular handle bar of the chain saw partially therein and generally centering said handle in relation to said rotatable shaft.

5. The chain saw holder of claim 4 wherein said first jaw is rotatably mounted on a portion of said rotatable shaft extending through said extension member.

6. The chain saw holder of claim 1 wherein said clamp means comprises a fixed jaw and a movable jaw across said clamp mouth, said movable jaw being operable to engage said fixed support and clamp the support between the movable jaw and the fixed jaw.

7. The chain saw holder of claim 6, wherein said movable jaw comprises a rotatably mounted jaw having a fixed support contact surface with V-shaped groove for receiving a generally cylindrical and irregular support at least partially therein.

8. The chain saw holder of claim 7 wherein said movable jaw is rotatably supported on a rotatable shaft with said V-shaped groove being generally centered about the axis of said shaft, said shaft being threadably mounted on said mouth defining means and being rotatable to move said movable jaw towards said opposing jaw.

9. The chain saw holder of claim 8 further comprising generally planar contact areas at the periphery of said movable jaw perpendicular to the axis of said shaft and being remote from the center of said V-shaped groove for contacting planar surfaces.

10. A chain saw holder attachable to a fixed support for holding and supporting a chain saw during refueling and maintenance, the chain saw having a laterally extending tubular handle bar, said chain saw holder comprising:

clamp means for clamping to the fixed support, said clamp means having means defining a clamp mouth for receiving the fixed support therein and for supporting at least one movable jaw which is movable toward and away from an opposing jaw to clamp the fixed support in said clamp mouth between said jaws;

an elongated extension member attached to and extending away from said clamping means;

chain saw attachment means supported by said extension member remote from said clamp means for attaching to said chain saw, said chain saw attached means comprising a spring steel clip having a base plate rotatably mounted on said extension member and having a looped-over segment providing a handle bar mouth for receiving the handle bar, the opening to the mouth being smaller than the diameter of the handle bar, said opening being expandable to receive said handle bar and securing said handle bar by at least partially closing with said handle bar being held in said mouth, said clip being pivotally mounted on said extension member at said base plate for pivotal movement about an axis generally perpendicular to said extension member to enable said handle bar mouth to receive said portion of said tubular handle bar with said received portion in orientation aligned with oblique to and perpendicular to said extension member;

whereby, said chain saw holder is operable when clamped onto a fixed support to receive and secure a portion of the tubular handle bar and hold and support the chain saw.

* * * * *